(12) United States Patent
Osborn et al.

(10) Patent No.: US 11,620,093 B2
(45) Date of Patent: Apr. 4, 2023

(54) SECURING PRINTED FEATURES USING VOLATILE DETERMINANTS

(71) Applicant: Capital One Services, LLC, McLean, VA (US)

(72) Inventors: Kevin Osborn, Newton Highlands, MA (US); David Kelly Wurmfeld, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/039,629

(22) Filed: Sep. 30, 2020

(65) Prior Publication Data

US 2022/0100441 A1    Mar. 31, 2022

(51) Int. Cl.
| | | |
|---|---|---|
| *G06K 15/02* | (2006.01) | |
| *G06F 3/12* | (2006.01) | |
| *H04L 9/40* | (2022.01) | |
| *G06F 21/60* | (2013.01) | |
| *G06V 30/224* | (2022.01) | |

(52) U.S. Cl.
CPC .......... *G06F 3/1222* (2013.01); *G06F 3/1288* (2013.01); *G06F 21/608* (2013.01); *G06V 30/2253* (2022.01); *H04L 63/0435* (2013.01); *H04L 63/0876* (2013.01)

(58) Field of Classification Search
CPC .... G06F 3/1222; G06F 3/1288; G06F 21/608; G06K 9/186; H04L 63/0435; H04L 63/0876
See application file for complete search history.

(56) References Cited

U.S. PATENT DOCUMENTS

| | | | |
|---|---|---|---|
| 5,550,932 A * | 8/1996 | Blaylock | G06K 1/125 283/52 |
| 5,720,012 A | 2/1998 | McVeigh et al. | |
| 5,774,879 A | 6/1998 | Custy et al. | |
| 7,027,744 B2 | 4/2006 | Simpson et al. | |
| 2002/0174334 A1 * | 11/2002 | Meadow | G06Q 20/042 713/168 |
| 2003/0025929 A1 * | 2/2003 | Fukushima | G06K 15/02 358/1.14 |
| 2003/0225708 A1 * | 12/2003 | Park | G06Q 20/382 705/69 |

(Continued)

OTHER PUBLICATIONS

Source Technologies. "ST9512 Secure MICR Printer User's Guide" Available from the Internet at https://health.mo.gov/living/families/wic/localagency/updates/pdf/ST9512_Manual.pdf. Dec. 2006. pp. 1-36.

(Continued)

*Primary Examiner* — Huo Long Chen
(74) *Attorney, Agent, or Firm* — Sterne, Kessler, Goldstein & Fox P.L.L.C.

(57) ABSTRACT

Securing printing systems and methods include a printer with a controller coupled to a memory and configured to perform a printer operation. The printer controller receives an instruction comprising a first font element and a second font element. An identifier corresponding to the second font element is retrieved from a memory. The printer generates and prints a graphical character that based on the first font element and an augmented symbol corresponding to the identifier.

17 Claims, 6 Drawing Sheets

(56) References Cited

U.S. PATENT DOCUMENTS

| | | | |
|---|---|---|---|
| 2004/0179216 A1* | 9/2004 | Reese | G06F 3/1239 |
| | | | 358/1.11 |
| 2004/0218209 A1* | 11/2004 | Hamaguchi | H04L 67/04 |
| | | | 358/1.15 |
| 2005/0094173 A1* | 5/2005 | Engelman | G06F 3/1243 |
| | | | 358/1.11 |
| 2005/0095016 A1* | 5/2005 | Simpson | G03G 21/1889 |
| | | | 399/12 |
| 2005/0108168 A1* | 5/2005 | Halpin | G06Q 20/042 |
| | | | 705/45 |
| 2007/0136787 A1* | 6/2007 | Chen | G06F 21/608 |
| | | | 726/3 |
| 2007/0242307 A1* | 10/2007 | Saikawa | G03G 21/04 |
| | | | 358/1.16 |
| 2018/0232610 A1* | 8/2018 | Kondo | G06K 15/1805 |

OTHER PUBLICATIONS

Source Technologies. "Paper Check to ePayments". Available from the Internet at https://www.sourcetech.com/wp-content/uploads/2019/11/Paper-Check-to-Fintech-1.pdf. Retrieved from the Internet on Apr. 30, 2020. pp. 1-16.

* cited by examiner

US 11,620,093 B2

SECURING PRINTED FEATURES USING VOLATILE DETERMINANTS

BACKGROUND

Financial institutions, such as banks, utilize secure printing measures, such as Magnetic Ink Character Recognition (MICR) technology. MICR technology uses magnetically chargeable ink or toner to print characters on the bottom of checks or other financial transaction documents. For example, a bank may print an account number from which money is to be drawn, a routing and transit of the check for the bank where the account resides, and an identification number.

After printing, the financial transaction documents are processed mechanically and electronically through a reader that magnetically reads and interprets information about the check, including the amount of the check, account number, institution upon which the check was drawn and other miscellaneous transaction codes. However, because MICR encoding is so widely used and accepted, banks may face challenges in securing printed features on financial transaction documents. For example, a person lacking authorization may obtain capability to fraudulently print financial transaction documents that can be processed without distinction.

BRIEF SUMMARY

The invention relates to devices and methods for printing documents, for example, secure documents such as a bank check, cashier's check, etc. Embodiments described herein include systems and methods for printing documents, including securing printed features. According to embodiments, a printing device receives a printing instruction. For example, a user generates and transmits, in a computer-implemented process, a printing instruction including a page description. The page description is transmitted by the computer to a printing device that is expected or intended to print the document. The printing device generates the document image based on the page description, where the instruction includes font elements, at least one of which addresses a volatile determinant, for example an identifier stored in a memory. For example, the printing instruction can include a first font element and a second font element, where the second font element may refer to a memory address associated with the identifier.

According to some embodiments, a controller of the printing device, such as a raster image processor, generates a graphical character that is to be printed based on a first font element and a volatile determinant corresponding to the identifier, and causes the graphical character to be printed by the printing device. According to some embodiments, the identifier can be a printer name, serial number, MAC address or authentication key corresponding to the printer. An advantage is that the system and processes permit the document, which can be a financial transaction document, to be legibly printed only on a printer that can access a volatile determinant that corresponds to an expected value. Otherwise, if a printing device receives the printing instruction but is not appointed with the expected determinant it can print a flawed or illegible document. Thereby, a bank or other institution is enabled to exercise control and authorization over the printing of secure documents, such as the financial transaction document.

BRIEF DESCRIPTION OF THE DRAWINGS/FIGURES

DETAILED DESCRIPTION

System for Securing Printed Features Using One or More Volatile Determinants

Figure 1:
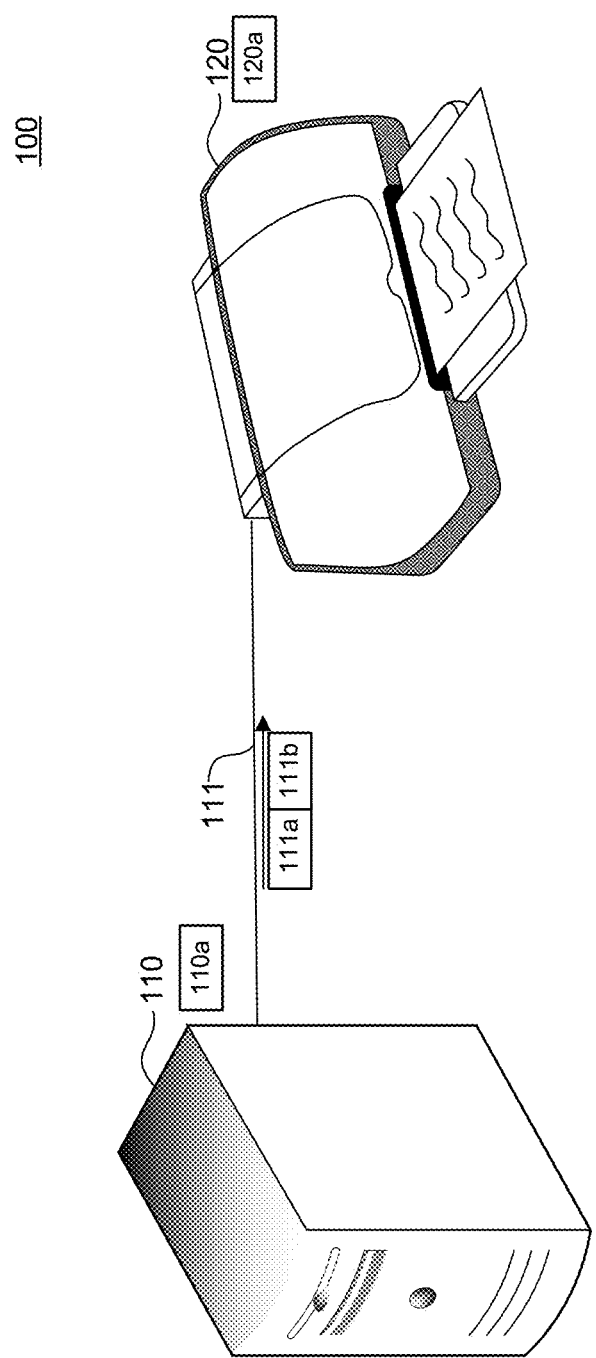
FIG. 1 is an illustration of a system for securing printed features using one or more volatile determinants, according to some embodiments.

FIG. 1 illustrates a system for securing printed features using one or more volatile determinants. As shown, a secure printing system 100 can include a computing device 110 configured to transmit a printing instruction 111 through at least one communication channel to one or more printers 120. Computing device 110 can include a processor and a memory coupled to the processer. The processor can be configured to execute instructions stored in the memory that perform operations of a computer application 110a to generate a printing instruction 111. For example, in a banking environment, a user, such as a bank employee, can use the computer application 110a to generate a secure document, such as a bank check.

According to some non-limiting examples, the printing instruction 111 can include a page description listing commands for rendering the bank check. The computer application 110a may generate the page description that includes elements designed to incorporate one or more volatile determinants. In such case, the user may intend for the document to be printable securely only on a printer that is specified by the computing device. The computer application 110a generates a printing instruction 111 that includes a first font element 111a and a second font element 111b. The printing instruction can reference a volatile determinant by at least one of the first and second font elements.

In some embodiments, one of the first and second font elements 111a/111b can include information about a font typeface, glyph, spacing, orientation, bitmap, height, pitch, or weight of a graphical character. In some embodiments, the other of the first and second font elements 111a/111b can include a reference to the volatile determinant, such a memory address associated with an identifier stored in a memory of a particular device. In some embodiments, the identifier may be stored onboard the printer circuitry, such as in a memory block 120a of the printing device. In other embodiments, the identifier may be stored in a device communicatively coupled to the printing device. Some non-limiting examples of the identifier can include, for example, a printer name, serial number, MAC address or authentication key corresponding to the printer. For example, the first font element may correspond to a font characteristic, while the second font element may correspond to the identifier.

The computing device 110 can transmit the printing instruction 111 from the computer application 110a to the printing device 120, for example by using a printer driver. The printing instruction can cause the printing device 120 to augment the first font element 111a based on a volatile determinant identified by retrieving a volatile determinant from memory 120a to render the document. The volatile determinant can be retrieved from memory 120a using information included in second font element 111b. For example, second font element 111b can include a reference to a memory address. By printing an augmented symbol that is based on the uniqueness of the printer, one printer 120 can be capable to securely print the rendered document as intended by computer application 110a. However, a different printer that receives printing instruction 111 may render the image of the document in a manner or styling that is not intended by computer application. That is, a different printer may not have access to the expected determinant in a corresponding memory address. The document rendered by printer 120 can be considered as rendered correctly where a symbol based on the first font element 111a and legibly augmented based on volatile determinant can be properly subsequently scanned and processed. A document, as rendered by a different printer, may be rendered unsuitable for processing where it is not encoded with the augmented symbol as intended by computer application 110a, where a different printer lacks the same volatile determinant (e.g., has a different MAC address, serial number, etc.).

In this example, the computer application 110a may generate printing instructions based on a first font element 111a, e.g., a glyph of a MICR font, and a second font element 111b, e.g., an address for a name or other identifier associated with and stored on the intended printing device, e.g., 120. The computer application 110a may determine the printing instruction to render a legible graphic only on the intended printing device 120. In some embodiments, the computer application can generate the printing instruction by first determining an intended glyph or other attribute and then determining an instruction that provides a display list having the intended symbol when the first font element is augmented based on a value of the volatile determinant, such as printer name of the printing device 120 where the document is expected or intended to be printed.

Figure 2:
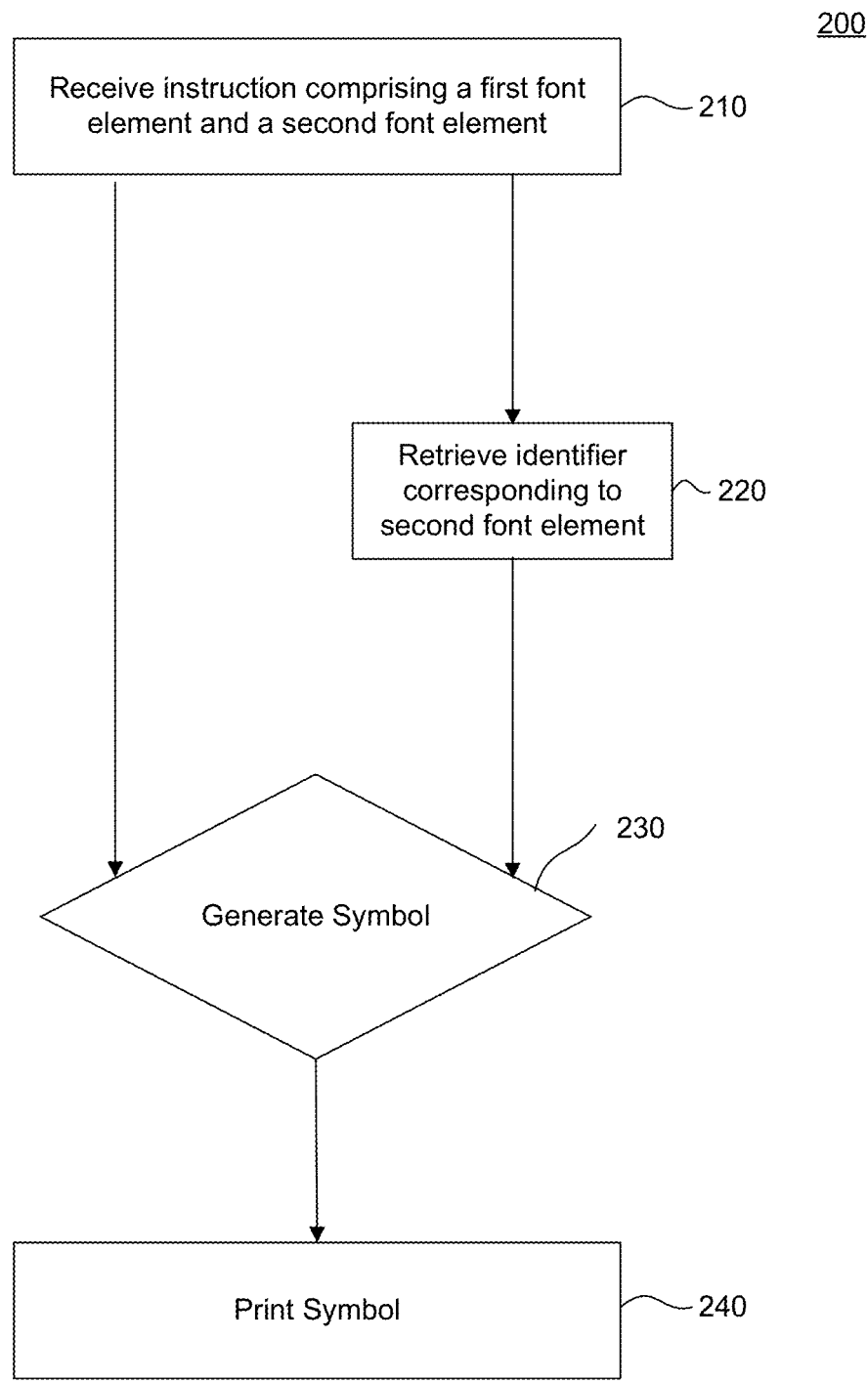
FIG. 2 is a flow diagram of a method for securing printed features using one or more volatile determinants, according to some embodiments.

FIG. 2 is a flow diagram of Method 200 that performs secure printing by incorporating the one or more volatile determinants in a process of rendering a printable document. In some embodiments, method 200 performs secure printing to render the document legible or capable of being validly scanned, only when the document is printed on an intended or expected printing device. Based on the disclosure herein, operations in method 200 can be performed in a different order and/or vary.

In some embodiments, method 200 performs secure printing of a financial transaction document, such as a check. In embodiments of method 200, a computer application 110a incorporates information in the printing instructions 111 to encode a font glyph or character that is rendered utilizing, at least in part, the value of the volatile determinant. When the expected determinant is validly retrieved from the memory, the printed document can be scanned or processed. When a printing device does not or cannot retrieve the expected determinant, the printer 120 may print a document with omitted necessary characters, illegible characters, or characters that are otherwise incapable of being scanned or processed.

Referring to FIG. 2, at operation 210, a printing device receives a printing instruction. For example, a computer application (e.g., computer application 110a) may convert a desired image to a printing instruction. In some aspects, the image can be a symbol such as a glyph, character, or other textual or graphical image. The printing instruction can include a page description generated by the computer application and transmitted to the printing device by a printer driver. The printing instruction can comprise a first font element and a second font element. In some embodiments, a display list is generated by a decomposer based on the printing instruction. For example, the display list may include the first and second font elements interpreted from the printing instruction.

In some embodiments, at least one of the first and second font elements 111a/111b can indicate font characteristic and the other of the first and second font elements 111a/111b can indicate a reference to a volatile determinant. A volatile determinant generally means a value that is stored in a memory, such as an identifier stored in a memory of the printing device or another device. In some embodiments, the identifier may be stored onboard the printer circuitry, such as in a memory block 120a of the printing device 120. In other embodiments, the identifier may be stored in a device communicatively coupled to the printing device 120. Some non-limiting examples of a volatile determinant include a MAC address of the printer or of a network interface of the printer, a serial number, an identifier stored in a memory, an encryption key, authentication password, etc. In a non-limiting example of operation 210, the first font element may correspond to a font characteristic, while the second font element may correspond to an address in memory of the identifier.

At operation 220, the printing device 120 can, for example by a printer controller, retrieves a value based on the identifier corresponding to the other of the first or second font element 110a/110b. In some embodiments, the printing device retrieves a volatile determinant from memory 120a based on the identifier. For example, a controller of the printing device 120 can place a memory address on a signal line, such as a control bus. The memory address can correspond to a value communicated in the second font element 110b. The controller can send a memory read control signal to the control bus. Based on these signals placed on the control bus, memory 120a of printing device 120 returns a value that is stored in a memory array location associated with the memory address. The controller thereby retrieves the volatile determinant. The controller can subsequently terminate the read cycle, e.g., by dropping the memory read control signal or sending another suitable signal.

In some embodiments, at 220 the printing device 120 can retrieve the volatile determinant from memory 120a, which can be a main memory, an on-board memory, memory circuit, or other memory element disposed in the circuitry of printer 120. In some embodiments, memory 120a can be an external memory, such as a secondary memory, a memory disposed in a peripheral device, removable storage, or other memory that is communicatively coupled to printer 120.

According to some embodiments, memory 120a can be a memory of a peripheral device, the peripheral device requiring an authentication process before returning the volatile determinant. For example, a printer 120 and a peripheral device coupled to printer 120 that includes memory 120a, can return the volatile determinant and complete operation 220, only after completing a handshake process is successfully negotiated. For example, printer 120 and the peripheral device of memory 120*a* can perform a password authentication protocol, Password-authenticated key agreement (PAKE), extensible authentication protocol (EAP), challenge handshake protocol (CHAP), challenge-response authentication (CRA) or other authentication method to validate and securely perform operation 220.

At operation 230, the printing device 120 generates an augmented symbol, such as a graphical or textual character, based on the first font element and an aspect based on the identifier. In a non-limiting example, the printing device generates an image of a graphical or textual character based on the first font element and the volatile determinant, where the volatile determinant is determined at 220 based on the identifier.

For example, a controller of the printing device 120 can generate an augmented symbol based on a style, pattern, or geometrical or other characteristic, associated with a value of the identifier. In a non-limiting example, the controller can generate an augmented symbol based on a mathematical operation to determine a glyph, i.e., a geometric shape, where the operation is based on a value of the identifier retrieved from memory block 120*a*.

In some embodiments operation 230 includes a raster imaging process. For example, one or more controllers of the printer can include a raster image processor (RIP) that performs operations based on the page description received by the printing device. The RIP converts the page description into a display list of objects. This display list can contain a text or non-text descriptor for an object that is to be printed. For example, a text descriptor can specify each text character, its font, and a coordinate corresponding to a location on the page where the object is to be printed. A non-text object can include a bit mapping, vector mapping, or other graphical mapping for conversion by the RIP.

In some embodiments, the printing device 120 generates an augmented symbol that is an image of a graphical or textual character based on the volatile determinant. The volatile determinant, at 220, is determined based on the identifier, and the one of the first and second font elements 111*a*/111*b*. For example, the contents of a word processing document include text styled based on a value of the volatile determinant associated with the identifier. The contents are translated by the RIP into printer constructions that can include a bit for each pixel location indicating whether that pixel is to be black or white. For example, in a binary print a digital array of pixels assigns a digital value to every pixel represented either a one or a zero. Alternatively, multiple-bit images, can be represented by a digital array of pixels, wherein the pixels have assigned values of more than two number possibilities. The RIP renders the display list into a continuous tone (or "contone") mapping for the page to be printed. The mapping represents every pixel location on the document to be printed by a density value for each color to be printed. The RIP rasterizes the mapping into a bit map for use by the printer.

At operation 240, the printing device prints the character. The printing device 120 can include a printhead, developer, or other component that transfers ink components to paper, for example. By way of example, the ink components can include resinous, pigmented toner particles, magnetic carrier particles and other components. In one non-limiting example, the developer may retrieve toner from a MICR cartridge, where the toner is designed specifically for check printing.

EXAMPLES

Figure 3:
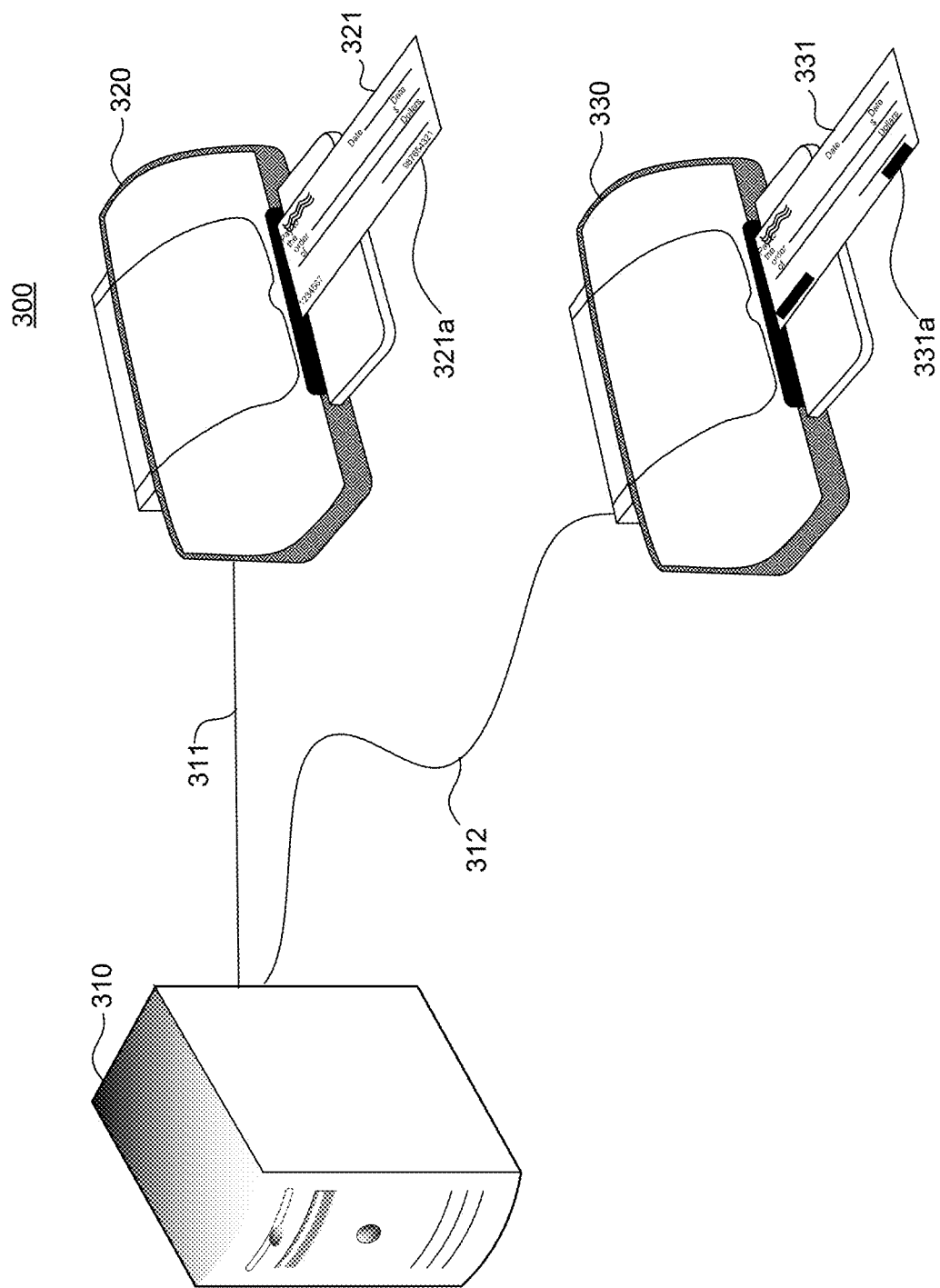
FIG. 3 is an illustration of a system that includes a device securing printed features using one or more volatile determinants, according to some embodiments.

Computer-Implemented System and Process for Securing Printed Features Using Volatile Determinant FIG. 3 illustrates an arrangement of a system and method for securing printed features based on one or more volatile determinants. Examples can incorporate any of the embodiments disclosed herein to include methods and systems for controlling operation of a printer.

For example, a secure printing system 300 can include a computing device 310, one or more communication channels 311 and 312, and one or more printers 320 and 330. Computing device 310 can include a computer application to generate a printing instruction. For example, in a banking environment, a user, such as a bank employee, can use the computer application to generate a secure document, such as a bank check.

For example, the printing instruction can include a page description listing commands for rendering the bank check. The computer application may generate the page description that includes elements designed to incorporate one or more volatile determinants. In such case, the user may intend for the document to be printable securely only on a printer that is specified by the computing device. The computer application generates a printing instruction that includes a first font element and a second font element. The computer application can reference a volatile determinant by at least one of the first and second font elements.

The computing device 310 can transmit the printing instruction from the computer application to a printing device, for example by using a printer driver. In an example, the printing instruction can be intended to (a) securely print the document to printing device 320, and (b) render the associated document unsuitable for printing on other printing devices, such as printing device 330. In one non-limiting example, the computing device may also retain, in a memory, a value of the expected volatile determinant.

For example, the computing device 310 may store information about a printer name, MAC address, or the like, of the designated secure printer. This information can be applied as the expected volatile determinant in generating a print instruction.

Then, the computer application can determine an intended document image, e.g., a bank check, to be printed. Then, the computing device can formulate a two-part font command that will result in the properly rendered image. A first part (e.g., the first font element) can be a general reference to a font typeface, for example. The second part (e.g., the second font element) can include a coded reference. Specifically, the second part can be a code to incorporate the volatile determinant into the printing instruction. When coupled correctly, e.g. the volatile determinant retrieved on the printer corresponds to the expected volatile determinant, the printed check image can match the image as intended by the computer application. On the other hand, if the printing instruction is intercepted, for example, and printed to an unintended printer that has a different printer name or MAC address, then the printed check image does not match the intended image. By this feature, the user or enterprise can securely control the printing of important documents, such as a bank check or other financial instrument, minimizing the risk of financial loss.

The computer application may determine the printing instruction to render a legible graphic 321*a* only on the intended printing device 320 and to render an illegible graphic 331*a* on another printing device 330. As described above, the graphic 331*a* is illegible or otherwise incapable of being validly scanned where printing device 330 cannot access the intended determinant. In some embodiments, the computer application can generate the printing instruction by first determining an intended glyph or other attribute and then determining an instruction that results in a display list having the intended (e.g., augmented) symbol. In one non-limiting example, the computer application can receive an input from a user, such as an employee or agent of a bank or other financial institution that includes an account number. Based on the input, the computer application can determine, for each numeral of the account number, an intended symbol, such as a glyph. The computer application can then generate a two-part instruction for rendering the intended symbol. The first part (which can be, for example, first font element 110a) can include an element of the font, such as typeface, glyph, etc. The second-part can include a styling, patterning, or other augmenting that is encoded based on an expected or intended value of a volatile determinant. When communicated to the printer 320, the instruction can cause the first font element 110a to be augmented based on the volatile determinant only if the intended value of the volatile determinant is provided by the operation of the printer 320. That is, the intended symbol can be printed only if the intended value (such as printer name, where the document is expected or intended to be printed) is matched by the actual volatile determinant retrieved by printer 320 (such as printer name of the printer where the document is actually printed).

An example pseudo-code for a print command may be as follows:

| | |
|---|---|
| 10 | Reset the printer; |
| 20 | Print bank check template; |
| 30 | Print account holder and check amount; |
| 40 | Generate (or augment) a glyph based on (1) a first font element (e.g., MICR font) and (2) another font element, such as a pattern, augmentation, or format that is determined based on the printer MAC Address; |
| 40 | Print Account Routing Information in the glyph |
| 50 | Eject paper and end job. |

In one non-limiting example, an operation to generate, or augment, a glyph can include a function for determining whether an expected determinant is satisfied. For example, an algorithm for generating a glyph can include an operation to determine whether a condition of the volatile determinant is satisfied, i.e., a conditional statement such as:

```
if (boolean_function_determinant_satisfied(determinant)
    define glyph (e.g., do not augment)
else
    redefine glyph shape (e.g., Flip PoinT)
Render font
```

Figure 4A:
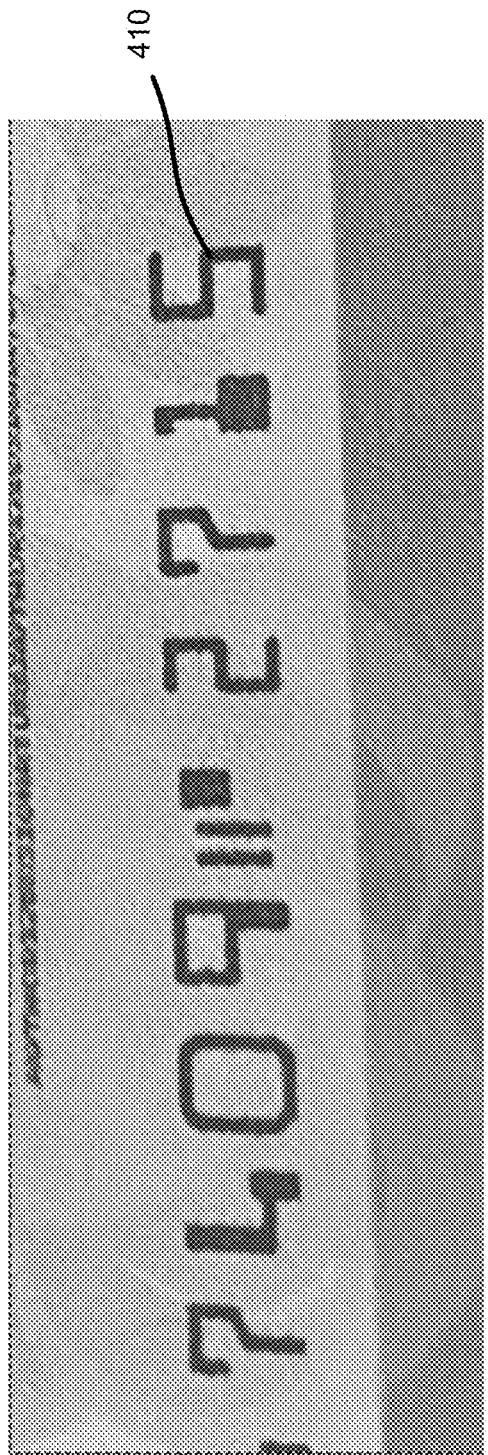
FIGS. 4A and 4B are photographs of exemplary documents printed based on systems and methods for securing printed features using one or more volatile determinants, according to some embodiments.
Figure 4B:
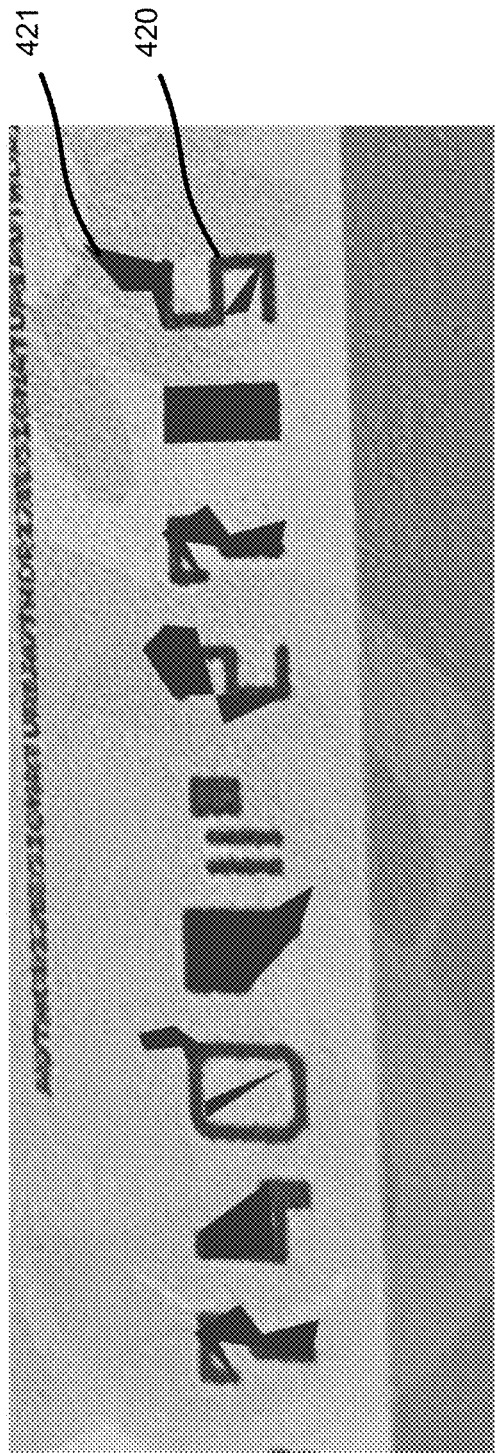

Embodiments can include other suitable algorithms for generating a symbol and the above example is not intended to be limiting. As noted above, when the volatile determinant retrieved on the printer (e.g., printer 320) corresponds to the expected volatile determinant, the printed check image 321 includes a legible graphic 321a that will match the image as intended by the computer application. Otherwise, the printed check image 331 printed from a different printer 330 that does not have a corresponding volatile determinant (e.g., MAC address) renders an illegible graphic 331a that is not suitable for processing or scanning. In some embodiments, FIGS. 4A and 4B are photographs, respectively, of an exemplary document 401 (e.g., a check) as rendered and output an authorized printing device (e.g., printing device 320). In a non-limiting example, document 401 includes symbols 410 that are legibly printed, and capable of being scanned and processed by one or more processing methods and devices. Such techniques may include scanning document 401 and processing symbols 410 to identify at least routing, transit, account, and check information, associated with the document 401. The information can be identified, using symbols 410, by an image recognition, computer vision, Optical Character Recognition (OCR) process, Intelligent Character Recognition (ICR), Natural Language Processing (NLP), Optical Character Verification (OCV), artificial intelligence (AI), or other technique for determining information conveyed by symbols 410. As described above, document 401 is an example of a document output by an unauthorized printing device, for example, a printing device 330 in which address information conveyed in second font element 111b does not return a volatile determinant or does not return an expected value of the intended volatile determinant. For example, document 402 includes symbols 421 that include one or more defects 422. Defects 422 can include anomalies, omissions, artifacts, or other deficiencies related to one or more symbols, as a result of the erroneous or missing volatile determinant. In some embodiments and as discussed above, defects 422 can render document 402 illegible, or otherwise obfuscate further processing of document 402.

Figure 5:
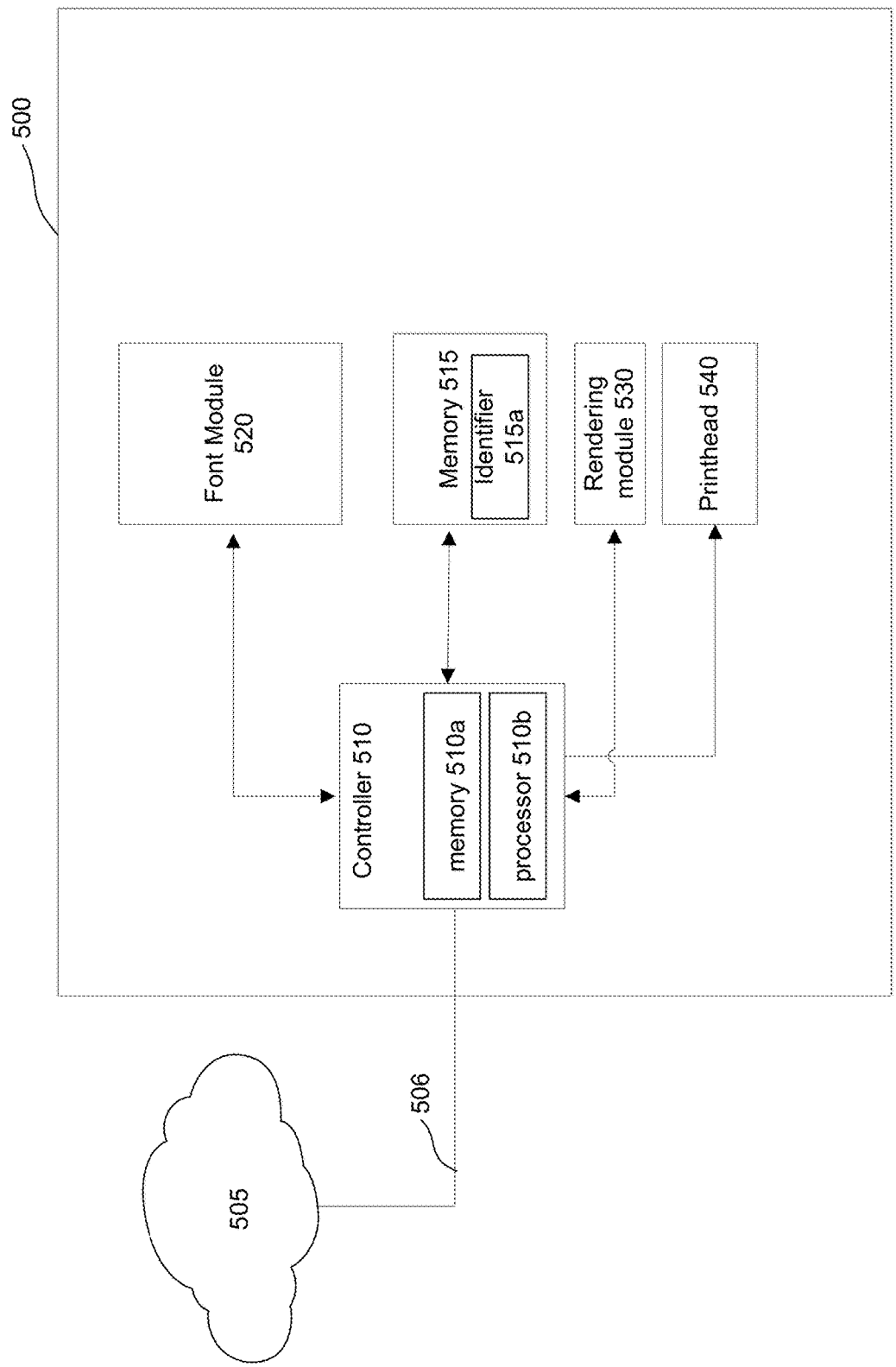
FIG. 5 is an illustration of a device for securely printing features using one or more volatile determinants, according to some embodiments.

FIG. 5 illustrates a configuration of a printing device for use in a process of securing printed features based on one or more volatile determinants. As shown in FIG. 5, printing device 500 is coupled with a communication network 505 via one or more communication channels 506. A printing instruction can be communicated from communication network 505 to printing device 500 by the one or more communication channel 506.

Printing device 500 can include a controller 510, with a memory 510a and processor 510b. The controller 510 is coupled with various circuits and modules to control the operation of printing device 500. Controller 510, which can be a logic and control unit (LCU), such as a digital computer or microprocessor operating according to control printer machine 500 and its various subsystems. Controller 510 can be programmed to provide control of printer machine 500 n response to signals from various sensors and encoders.

Printing device 500 further includes a font module 520, a memory 515, a rendering module 530, and a printhead 540. As described above, a printing instruction can include a page description listing commands for rendering the bank check. The computer application may generate the page description may include elements designed to incorporate one or more volatile determinants. In such case, the user may intend for the document to be printed securely only on a printer that is specified by the computing device. The computer application generates a printing instruction that includes a first font element and a second font element. The computer application can reference a volatile determinant by at least one of the first and second font elements. The controller 510 can generate commands based on the printing instructions to read font information from font module 520 based on the first font element coupled with an augmented symbol based on the volatile determinant.

In some embodiments, one of the first and second font elements can include information about a font typeface, glyph, spacing, orientation, bitmap, height, pitch, or weight of a graphical character. In some embodiments, the other of the first and second font elements includes a reference to the volatile determinant, such a memory address associated with an identifier 515*a* stored in the memory 515. In some embodiments, the identifier 515*a* may be stored onboard the printer circuitry, such as in memory 515 of the printing device. In other embodiments, the identifier may be stored in a device communicatively coupled to the printing device. Some non-limiting examples of the identifier can include, for example, a printer name, serial number, MAC address or authentication key corresponding to the printer. For example, the first font element may correspond to a font characteristic, while the second font element may correspond to the identifier.

In some embodiments, printhead 540 can include a belt and a writer, which are coupled together. Controller 510 can be configured to regulate a programmable voltage and charge applied to a belt such that a light projected from the writer to form a latent image of a document to be printed. The writer can include an array of light emitting diodes (LEDs), or other light source such as a laser or spatial light modulator. The writer exposes individual picture elements (pixels) of the belt with light at a regulated intensity and exposure. The exposing light discharges selected pixel locations of the photoconductor, so that the pattern of localized voltages across the photoconductor corresponds to the image to be printed. An image is a pattern of physical light which may include characters, words, text, and other features such as graphics, photos, etc. An image may be included in a set of one or more images, such as in images of the pages of a document. An image may be divided into segments, objects, or structures each of which is itself an image. A segment, object or structure of an image may be of any size up to and including the whole image.

Image data to be printed is provided by a device, such as a computer or microcontroller, server, computer workstation, scanner, etc. The image data is provided by communication channel 506. The image data can include information about the location and intensity of each pixel that is exposed by the printer. Signals from communication channel 506, in combination with control signals from controller 510 are provided to a rendering module 530, which can be a raster image processor (RIP). The digital images are converted by the rendering module 530 from their form in a page description language (PDL) to a sequence of serial instructions for the electrographic printer in a process commonly known as "ripping." The ripped image is provided to an image storage and retrieval system, which can be controlled by controller 510 and stored in memory 510*a*.

The rendering module 530 thus receives the printing instruction from the server or other computing device, determines the printing and finishing requirements of the job, analyzes the PDL (Page Description Language) to reflect any job or page requirements that were not stated in the header; resolve any conflicts between the requirements of the job and the Marking Engine configuration (i.e., RIP time mismatch resolution); keep records and error logs and provide this information to any subsystem, upon request, translates the data from PDL (Page Description Language) to the printhead 540 for printing, and supports diagnostics communication between computing applications. The RIP accepts a print job in the form of a Page Description Language (PDL) such as PostScript, PDF or PCL and converts it into raster, for acceptance by the printhead 540. The received PDL file describes the layout of the document as it was created on the computing device used by the user. This conversion process is called rasterization. The RIP makes the decision on how to process the document based on what PDL the document is described in. After the document has been converted to raster by the rendering controller 530, the Raster data goes to the controller 510 via RTS (Raster Transfer Services), which transfers the data over an IDB (Image Data Bus).

Figure 6:
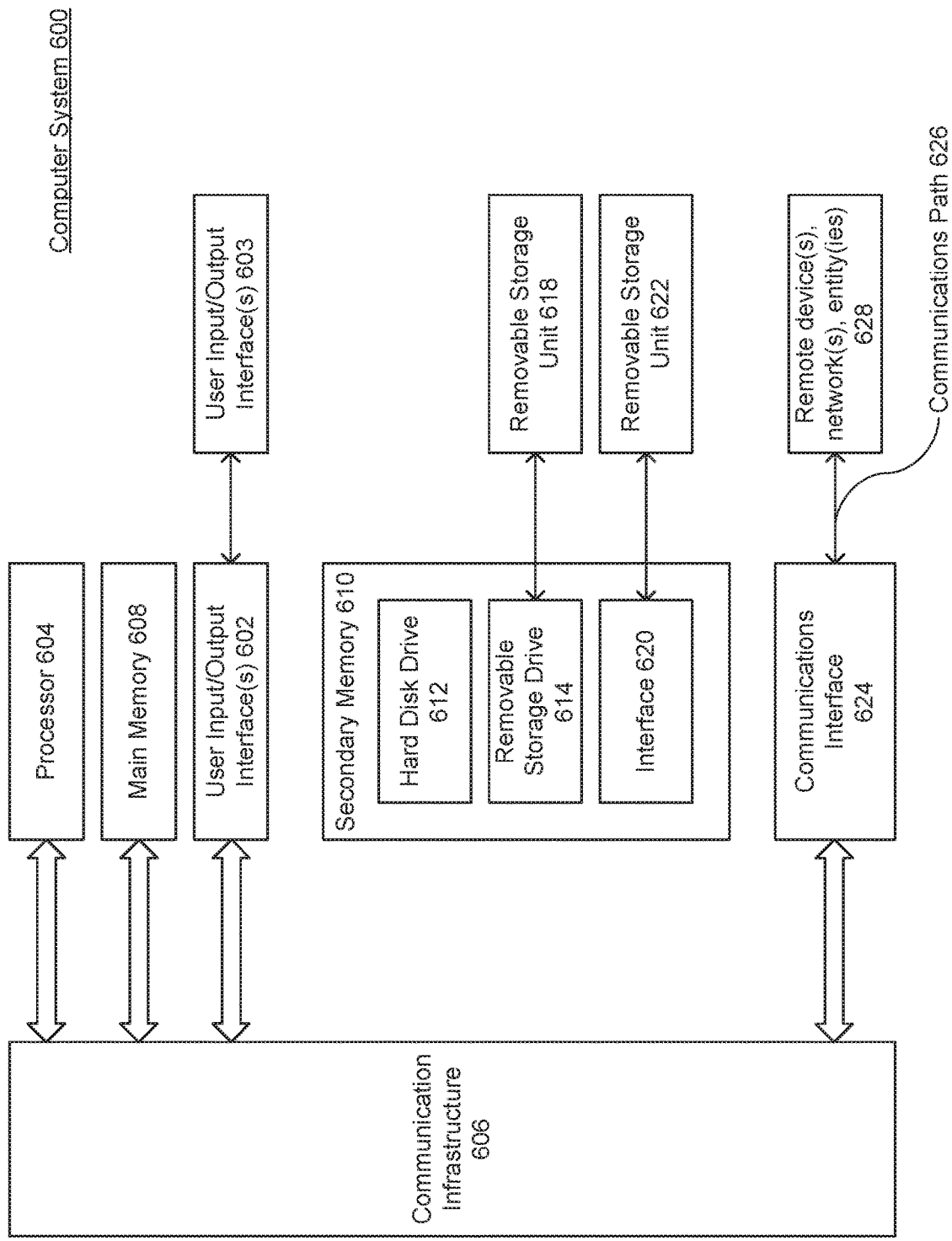
FIG. 6 is an illustration of a computer architecture of a system for securing printed features using one or more volatile determinants, according to some embodiments.

Various aspects of the exemplary embodiments may be implemented in software, firmware, hardware, or a combination thereof. FIG. 6 is an illustration of an example computer system 600 in which embodiments of the present disclosure, or portions thereof, can be implemented as computer-readable code. Various embodiments of the present disclosure are described in terms of this example computer system 600. For example, the computer system or the process controller of IMP 100 can be incorporated as an embodiment of computer system 600.

Computer system 600 includes one or more processors, such as processor 604. Processor 604 is connected to a communication infrastructure 606 (e.g., a bus or network).

Computer system 600 also includes a main memory 608, such as random access memory (RAM), and may also include a secondary memory 610. Secondary memory 610 can include, for example, a hard disk drive 612, a removable storage drive 614, and/or a memory stick. Removable storage drive 614 can include a floppy disk drive, a magnetic tape drive, an optical disk drive, a flash memory, or the like. Removable storage drive 614 reads from and/or writes to a removable storage unit 618 in a well-known manner. Removable storage unit 618 can include a floppy disk, magnetic tape, optical disk, flash drive, etc., which is read by and written to by removable storage drive 614. Removable storage unit 618 includes a computer-readable storage medium having stored therein computer software and/or data. Computer system 600 includes a display interface 602 (which can include input and output devices 603, such as keyboards, mice, etc.) that forwards graphics, text, and other data from communication infrastructure 606 (or from a frame buffer not shown).

In alternative implementations, secondary memory 610 can include other similar devices for allowing computer programs or other instructions to be loaded into computer system 600. Such devices can include, for example, a removable storage unit 622 and an interface 620. Examples of such devices include a program cartridge and cartridge interface (such as those found in video game devices), a removable memory chip (e.g., EPROM or PROM) and associated socket, and other removable storage units 622 and interfaces 620 which allow software and data to be transferred from the removable storage unit 622 to computer system 600.

Computer system 600 can also include a communications interface 624. Communications interface 624 allows software and data to be transferred between computer system 600 and external devices. Communications interface 624 can include a modem, a network interface (such as an Ethernet card), a communications port, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and can be implemented using wire or cable, fiber optics, a phone line, a cellular phone link, a RF link, or other communications channels.

In this document, the terms "computer program storage medium" and "computer-readable storage medium" are used to generally refer to non-transitory media such as removable storage unit 618, removable storage unit 622, and a hard disk installed in hard disk drive 612. Computer program storage medium and computer-readable storage medium can also refer to memories, such as main memory 608 and secondary memory 610, which can be semiconductor memories (e.g., DRAMs, etc.). Embodiments of the present disclosure can employ any computer-readable medium, known now or in the future. Examples of computer-readable storage media include, but are not limited to, non-transitory primary storage devices (e.g., any type of random access memory), and non-transitory secondary storage devices (e.g., hard drives, floppy disks, CD ROMS, ZIP disks, tapes, magnetic storage devices, optical storage devices, MEMS, nanotechnological storage devices, etc.).

These computer program products provide software to computer system 600. Embodiments of the present disclosure are also directed to computer program products including software stored on any computer-readable storage medium. Such software, when executed in one or more data processing devices, causes a data processing device(s) to operate as described herein.

Computer programs (also referred to herein as "computer control logic") are stored in main memory 608 and/or secondary memory 610. Computer programs may also be received via communications interface 624. Such computer programs, when executed, enable computer system 600 to implement various embodiments of the present disclosure. In particular, the computer programs, when executed, enable processor 604 to implement processes of embodiments of the present disclosure, such as the operations in the methods illustrated by FIG. 4 in system 600. Where embodiments of the present disclosure are implemented using software, the software can be stored in a computer program product and loaded into computer system 600 using removable storage drive 614, interface 620, hard drive 612, or communications interface 624.

The functions/operations in the preceding embodiments can be implemented in a wide variety of configurations and architectures. Therefore, some or all of the operations in the preceding embodiments—e.g., the functions of system 100 described in FIGS. 1, 3, and 4, and the method/process described in FIG. 2—can be performed in hardware, in software or both. In some embodiments, a tangible apparatus or article of manufacture including a tangible computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein. For example, the hardware/equipment can be connected to or be part of element 628 (remote device(s), network(s), entity (ies) 628) of computer system 600.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for operation of a printer, the printer comprising a controller configured to perform a printer operation, the method comprising:
receiving, by the controller, an instruction comprising a first font element and a second font element, the first font element including incomplete font data for a font to be used for printing and the second font element including a memory address associated with an identifier;
performing, by the controller, an authentication protocol with a peripheral device;
retrieving, from a memory of the peripheral device, the identifier corresponding to the second font element, in response to performing the authentication protocol with the peripheral device;
augmenting the first font data based on a volatile determinant corresponding to the identifier to generate complete font data;
generating, by the controller, a graphical character based on the complete font data; and
printing, by the printer, the graphical character,
wherein the identifier includes at least one of a printer name, a serial number, a MAC address, and an authentication key corresponding to the printer.

2. The method of claim 1, wherein the first font element comprises information about a font typeface, spacing, orientation, bitmap, height, pitch, or weight of the graphical character.

3. The method of claim 1, wherein the volatile determinant comprises information about a font typeface, spacing, orientation, bitmap, height, pitch, or weight of the graphical character, wherein the information is determined based on information associated to the identifier.

4. The method of claim 1, wherein the printing comprises printing the graphical character on a security paper and enables authentication of the security paper by a device configured to read the graphical character.

5. The method of claim 1, wherein the graphical character comprises a symbol of a magnetic ink character recognition (MICR) font.

6. The method of claim 1, wherein the retrieving comprises retrieving the identifier from a memory cell corresponding to the memory address.

7. The method of claim 6, wherein the retrieving comprises retrieving an authentication key from the memory of the peripheral device.

8. A printer, comprising:
a print head;
a control circuit configured to receive first and second font elements and perform a printing operation, the first font element including incomplete font data for a font to be used for printing and the second font element including a memory address associated with an identifier,
wherein the control circuit:
performs an authentication protocol with a peripheral device;
retrieves the identifier from a memory of the peripheral device based on the second font element, in response to performing the authentication protocol with the peripheral device;
augments the first font data based on the identifier to generate complete font data;
generates a graphical character based on the complete font data; and
performs the printing operation by transmitting, to the print head, an instruction to print the graphical character,
wherein the identifier includes at least one of a printer name, a serial number, a MAC address, and an authentication key corresponding to the printer.

9. The printer of claim 8, wherein the first font element comprises information about a font typeface, spacing, orientation, bitmap, height, pitch, or weight of the graphical character.

10. The printer of claim 8, wherein the augmented symbol comprises information about a font typeface, spacing, orientation, bitmap, height, pitch, or weight of the graphical character, wherein the information is determined based on information associated to the identifier.

11. The printer of claim 8, wherein the printing comprises printing the graphical character on a security paper, and enables authentication of the security paper by a device configured to read the graphical character.

12. The printer of claim 8, wherein the graphical character comprises a symbol of a magnetic ink character recognition (MICR) font.

13. The printer of claim 8, wherein the retrieving comprises retrieving the identifier from a memory cell corresponding to the memory address.

14. The printer of claim 8, wherein the retrieving comprises retrieving the authentication key from the memory of the peripheral device.

15. A system for authenticating a document, comprising:
a printing device, comprising:
a print head; and
a printing control circuit configured to receive first and second font elements and perform a printing operation, the first font element including incomplete font data for a font to be used for printing and the second font element including a memory address associated with an identifier;
an image sensor; and
a computing device coupled to the image sensor, the computing device comprising a controller;
wherein:
the control circuit performs an authentication protocol with a peripheral device;
the control circuit retrieves the identifier from a memory of the peripheral device based on the second font element, in response to performing the authentication protocol with the peripheral device, augments the first font data based on the identifier to generate complete font data, and generates a graphical character based on the complete font data;
the control circuit performs the printing operation by transmitting, to the print head, an instruction to print a document comprising the graphical character;
the computing device reads the document comprising the graphical character to determine validity of the document; and
the computing device enables authenticating of the document based on the determination,
wherein the identifier includes at least one of a printer name, a serial number, a MAC address, and an authentication key corresponding to the printer.

16. The system of claim 15, wherein the first font element comprises first font information about a font typeface, spacing, orientation, bitmap, height, pitch, or weight of the graphical character, wherein the augmented symbol comprises third font information about a font typeface, spacing, orientation, bitmap, height, pitch, or weight of the graphical character and wherein the third font information is determined based on information associated to the identifier.

17. The system of claim 15, wherein the document comprises a security paper, and wherein the computing device enables execution of the document based on the determination.

* * * * *